No. 763,867. PATENTED JUNE 28, 1904.
R. E. ELLIOTT.
CORN PLANTER.
APPLICATION FILED AUG. 17, 1903.
NO MODEL. 2 SHEETS—SHEET 1.
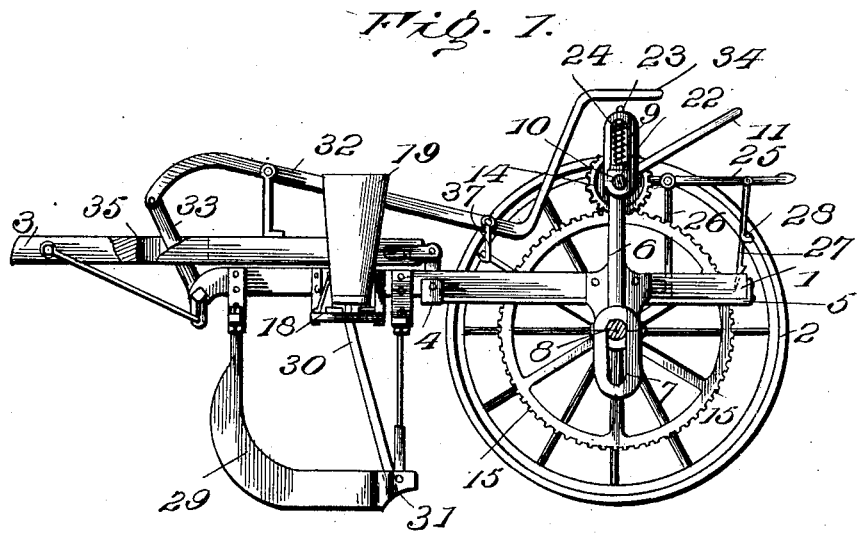
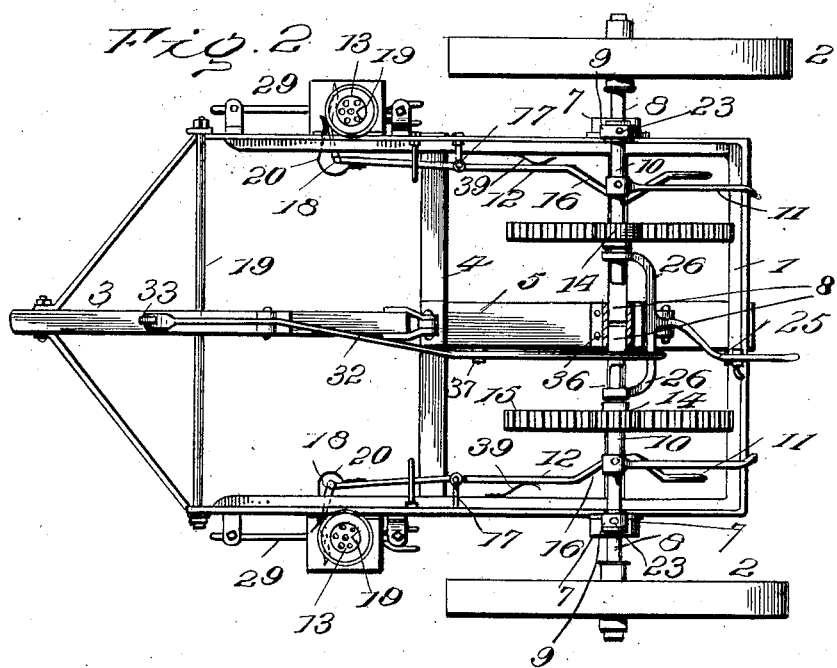

No. 763,867. PATENTED JUNE 28, 1904.
R. E. ELLIOTT.
CORN PLANTER.
APPLICATION FILED AUG. 17, 1903.
NO MODEL. 2 SHEETS—SHEET 2.
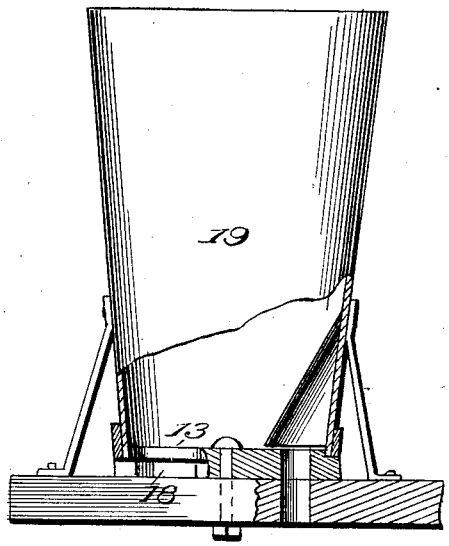
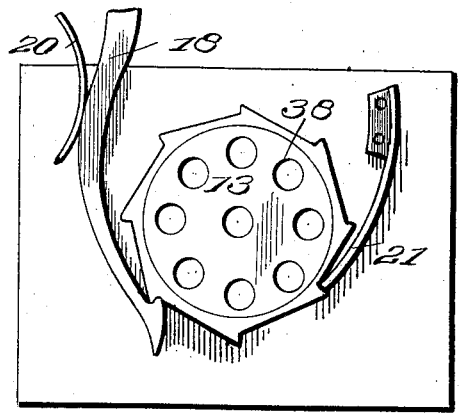

No. 763,867.

Patented June 28, 1904.

UNITED STATES PATENT OFFICE.

ROBERT E. ELLIOTT, OF MONROEVILLE, INDIANA.

CORN-PLANTER.

SPECIFICATION forming part of Letters Patent No. 763,867, dated June 28, 1904.

Application filed August 17, 1903. Serial No. 169,797. (No model.)

*To all whom it may concern:*

Be it known that I, ROBERT E. ELLIOTT, a citizen of the United States, residing at Monroeville, in the county of Allen and State of Indiana, have invented certain new and useful Improvements in Corn-Planters, of which the following is a specification.

This invention relates to the construction of corn-planters, providing more particularly improvements in the dropping mechanism, in means for raising the furrow-openers so as to hold the same out of action, and in the general structure of the implement, whereby the same is adapted to cause continuous dropping while the implement is under varied conditions of service. The dropping mechanism is operated through intermediate connections by the ground-wheels, and provision is made for the independent operation by each of said ground-wheels of said mechanism, so that continuous operation of the dropping mechanism is insured as the implement passes over inequalities in the ground which may cause either of the wheels to be thrown out of coöperating relation with the dropping mechanism.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side elevation of a planter, showing one of the axles in section. Fig. 2 is a top plan view of the planter, showing the peculiar disposal of the operating mechanism. Fig. 3 is a side elevation of a seed-hopper having a portion broken away to show the form of the dropping-disk located at the base of the hopper. Fig. 4 is a detail top plan view of the base upon which the hopper rests, showing the dropper-disk and the adjacent actuator-pawl.

Corresponding and like parts are referred to in the following description and indicated in all the views of the drawings by the same reference characters.

The planter comprises generally the frame 1, of approximately rectangular form, ground-wheels 2, peculiarly mounted upon the frame 1, and tongue 3, carried by the frame. A transverse bar 4 is secured to the frame, said bar having the rear end of the tongue 3 fulcrumed thereto. A longitudinal plate 5 extends about intermediate the frame, connecting the transverse bar 4 with the rear end bar of the said frame. Upon corresponding portions of the side bars of the frame are disposed vertical standards 6, which standards are provided at their lower ends with yokes 7, which receive the independent axles 8, upon which the ground-wheels are mounted. Guide-boxings 9 are carried by the upper ends of the vertical standards, being, preferably, of integral formation with the standards. The guide-boxings 9 receive the ends of a shaft 10, thereby serving as journals for the shaft. The shaft 10 is provided with arms 11, which actuate the levers 12, which operate the dropper-disks 13. The shaft 10 is provided with gears 14, which mesh with gears 15, which are rigidly secured to the independent axles 8. The axles 8 are revolved by the ground-wheels 2 as the implement advances, and thereby a rotary movement of the arms 11, carried by the shaft 10, is secured, and these arms, as aforesaid, actuate the levers 12, which are provided with cams 16, which latter receive the impact of the said arms as they pursue the rotary movement described. The levers 12 are pivoted to brackets 17, projected inwardly from the frame 1, and pawls 18 are carried by corresponding ends of the said levers. The pawls 18 actuate the toothed dropping-disks 13, disposed upon the base of the hopper 19. Springs 20 hold the pawls normally in engagement with the toothed peripheries of the dropping-disk, and a spring-pawl 21 adjacent each of the disks serves to hold the same at a fixed point in their revolution. The shaft 10, which indirectly operates the dropping mechanism, is yieldingly mounted in the guide-boxings 9, being normally held in a lowermost position relative to the said boxings by guide-blocks 22, which bear against the upper sides of the shaft and which are provided with integral stems 23, a coil-spring 24 being disposed about the stems 23 to hold the shaft in the normal position before mentioned.

Means are provided for throwing the dropping mechanism out of gear, and for this purpose a lever 25 is provided upon the rear of the frame, being fulcrumed to a standard 26, disposed upon the plate 5. The lever 25 has bifurcated portions 26, which are provided with bearings to receive the shaft 10. A pendent bar 27 is carried by the lever 25 and is provided with an engaging-hook 28, by which the position of the lever may be fixed when the same has been operated, so as to raise the shaft 10 to disengage the intermeshing gears 14 and 15. The hook 28 is adapted to engage the rear bar of the frame 1 when the shaft 10 is thrown into the position above described.

When the operation of the dropping mechanism is discontinued, the furrow-opening means is also thrown out of action. The furrow-openers 29 are suitably secured to the front portions of the side bars of the frame 1, and the grain-tubes 30 are disposed in the usual manner relative to the furrow-openers, having their lowermost portions received between the bifurcated parts 31 of the adjacent furrow-openers. An operating-lever 32 is fulcrumed to the tongue 3, and a link 33 connects the forward end of the said lever to the front bar 19 of the frame of the implement. The lever 32 is adapted to secure the frame at an ascertained adjustment relative to the tongue, so as to hold the furrow-openers out or in action. The rear portion of the operating-lever is curved upwardly and rearwardly, so as to dispose the handle 34 above the shaft 10 at a convenient point for operation by the operator of the implement. The link 33 passes through an elongated opening in the tongue 3, and a hook 37 is carried upon an intermediate portion of the lever 32 and is adapted to engage the transverse bar 4 of the frame, so as to hold the furrow-openers out of action.

A bearing 36 is located upon the plate 5 and receives the inner ends of the axle 8, which, as before brought out herein, are independently mounted relative to the frame for purposes which appear herein, the ends of the axles being shown in broken lines. The arms 11, which are projected from the shaft 10, have their end portions, which move into contact with the cams 16, slightly curved for obvious reasons.

In the operation of the implement under normal conditions as the same advances over the field the shaft 10 is revolved by means of the intermeshing gear-wheels 14 and 15, thus causing a rotary movement of the arms 11. The arms as they rotate move into contact with the cams 16, carried by the levers 12, thereby actuating the levers, causing the dropper-disks to revolve under the influence of the pawls 18, thereby moving the said disks so as to bring a successive series of openings 38 provided therein into register with corresponding series of openings in the base of the hopper 19. When moving the implement to and from the field where it is to be operated, the dropping mechanism is thrown out of operation by the lever 25, thereby raising the shaft 10, throwing the gears 14 and 15 out of engagement. The lever 32 is likewise operated to throw the furrow-openers out of action by depressing the same in a manner which will be apparent and engaging the hook 37 with the bar 4, thereby raising the forward portion of the frame.

The independent mounting of the axles 8 is advantageous in that should the ground-wheel come to a depression or like inequality in the ground the same will lower relative to its mounting upon the frame and the gear-wheel 15, carried by the axles of such ground-wheel, will be disengaged from the corresponding gear-wheel 14, carried by the shaft 10. Since the gear-wheel 14, carried by the opposite axle, however, still remains in mesh with the gear-wheel 15, with which it engages, the shaft 10 will continue to revolve under the independent actuation of the latter-mentioned axles. It will thus be seen that either of the gear-wheels 15, carried by the axles, is adapted to independently operate the yieldingly-mounted shaft 10, and thus the continuous revolution of the said shaft is insured. A spring 39 is carried by the frame adjacent each of the levers 12, and these serve to normally hold the levers, with the cam portions 16, in the path of the rotating arms 11.

Having thus described the invention, what is claimed as new is—

1. In a planter, the combination with a frame, supporting-wheels automatically movable toward and from the plane of the frame, and dropping mechanism actuated by the aforesaid ground-wheels.

2. In a planter, the combination with a frame, dropping mechanism carried by the frame, and ground-wheels independently and automatically movable toward and from the frame, said ground-wheels being adapted for simultaneous or independent actuation of the dropping mechanism.

3. In a planter, the combination with a frame provided with elongated bearings therein, supporting-wheels mounted for automatic movement in the aforesaid bearings, and dropping mechanism carried by the frame for actuation by the ground-wheels.

4. In a planter, the combination with a frame, dropping mechanism carried by the frame and including an actuator-shaft, ground-wheels independently mounted upon the frame and adapted for movement toward or from the said frame and for actuation of the actuator-shaft, and connecting means between the ground-wheels and the actuator-shaft.

5. In a planter, the combination with a frame, dropping mechanism carried by the frame and including an actuator-shaft, ground-wheels mounted upon the frame independent of each other and adapted for movement toward and from the body of the frame, intermeshing gears carried by the actuator-shaft and the ground-wheels to cause actuation of the aforesaid actuator-shaft.

6. In a planter, and in combination, with a frame, standards projected from the said frame, a shaft mounted in bearings in said standard and adapted for actuation of the dropping mechanism, axles independently mounted in bearings upon the frame and adapted for movement toward and from the frame, gears carried by the said axles, gears disposed upon the shaft aforementioned for coöperation with the gears upon the axles, and ground-wheels mounted upon the axles and adapted to actuate the same so as to cause rotation of the shaft.

7. In a planter, the combination with a frame, axles independently mounted upon the frame and adapted for a vertical movement relative thereto, ground-wheels carried by the said axles, dropping mechanism disposed upon the frame and including a transverse actuator-shaft yieldingly mounted in standards projected from the frame, independent gear elements carried by the independent axles, intermeshing gear elements carried by the actuator-shaft aforesaid, and means for operating the actuator-shaft so as to throw the gears, carried by the same, out of mesh with the gear elements upon the independent axles.

8. In a planter, the combination with a frame, yoke members depending from the frame and standards projected upwardly from the frame and provided with guide-boxings at their upper ends, axles independently mounted in the yoke members of the frame and adapted for independent movement toward and from the body of the frame, an actuator-shaft mounted in bearings in the guide-boxings aforesaid, intermeshing gear elements carried by the actuator-shaft and the independently-mounted axles, spring means disposed in the guide-boxings for normally holding the gear elements upon the actuator-shaft in meshing relation with the coöperating gear elements, an operating-lever connected to the actuator-shaft and adapted to throw the same into a position with the gear elements thereof out of mesh with the gears upon the independent axles, dropper-levers pivoted to the frame, hoppers carried by the frame, dropper-disks disposed at the base of the hopper for actuation by the dropper-levers, cams carried by the dropper-levers, and arms extended from the actuator-shaft and adapted for actuation of the dropper-levers by coöperation with the cams, carried by the latter, furrow-openers carried by the frame, and means for throwing the furrow-openers into and out of action.

In testimony whereof I affix my signature in presence of two witnesses.

ROBERT E. ELLIOTT. [L. S.]

Witnesses:
GEORGE E. SPOKE,
EDWARD FINAN.